United States Patent Office 3,835,082
Patented Sept. 10, 1974

3,835,082
AQUEOUS ALKALINE SOLUTION OF AN ALDE-
HYDE CONJOINT CONDENSATE OF RESORCIN-
OL AND SATURATED RESORCINOL POLYMER
Robert Lee Wright, Akron, Ohio, assignor to
Monsanto Company, St. Louis, Mo.
No Drawing. Continuation-in-part of application Ser. No.
159,453, July 2, 1971, which is a continuation-in-part
of application Ser. No. 59,720, July 30, 1970, both now
abandoned. This application Jan. 26, 1972, Ser. No.
221,027
Int. Cl. C08g 51/24
U.S. Cl. 260—29.3                  31 Claims

ABSTRACT OF THE DISCLOSURE

Aqueous alkaline solutions of an aldehyde conjoint condensate of a mixture of resorcinol and a saturated resorcinol polymer which are adhesives or adhesive adjuvants for bonding fiber to rubber. The resorcinol polymer comprising alkylene bridged resorcinol units resulting from introducing olefinic unsaturated radicals of 3–10 carbon atoms into the nucleus of the resorcinol. Aqueous compositions containing the condensate and rubber latex are also disclosed.

REFERENCE TO RELATED APPLICATIONS

This application is a continuation-in-part of application Ser. No. 159,453, filed July 2, 1971, now abandoned, which is a continuation-in-part of application Ser. No. 59,720, filed July 30, 1970, now abandoned.

This invention relates to methods of bonding synthetic fibers to rubber. More particularly the invention relates to improved adhesive compositions and to methods of bonding synthetic fibers to rubber by use of certain thermosetting resinous compositions comprising unsaturate-resorcinol polymers.

BACKGROUND OF THE INVENTION

The development of new synthetic fibers for making fiber-rubber composites has resulted in a continuing problem of bonding the new fibers to rubber. Adhesive compositions, based on resorcinol and formaldehyde were discovered early in the development of the art and achieved commercial acceptance for bonding nylon and rayon fiber to rubber but the adhesives acceptable for bonding rayon and nylon to rubber are not entirely satisfactory for polyester fiber. The adhesives of the present invention are particularly applicable to bonding polyester fiber to rubber. Alkenylresorcinols have heretofore been proposed as fiber bonding agents but are not to be confused with the compositions of the present invention which are polymeric and essentially saturated.

In the preferred method of practicing the invention, the unsaturate-resorcinol polymer is used in conjunction with conventional bonding agents to achieve improved adhesion as compared to the conventional treatment alone. For example, a composition comprising a resorcinol formaldehyde condensation product and a butadiene-styrene-vinylpyridine latex, called RFL is commonly used to bond synthetic fibers to rubber. The unsaturate-resorcinol polymer resins may advantageously replace the resorcinol in the RFL system to secure improved adhesion.

SUMMARY OF THE INVENTION

The adhesive or adhesive adjuvants of this invention comprises an essentially saturated soluble polymer of resorcinol and an unsaturate. The polymers contain alkylene di-resorcinol units and are believed to be mixtures of polymers which are essentially alkylene bridged resorcinol molecules of two or more resorcinol units, the alkylene bridge being attached to a carbon atom of the resorcinol nucleus. The nature of the alkylene bridge does not appear to affect the bonding properties of the adhesive compositions made from them. Alkylene bridges of two to eight carbon atoms are similarly effective.

The unsaturate-resorcinol polymers characterized by resorcinol units may be produced by the acidic condensation of resorcinol with an unsaturate. The alkylene bridge may be derived from an unsaturate selected from the group consisting of (1) a halo-olefin of 3 to 10 carbon atoms, (2) a dihaloolefin of 3 to 10 carbon atoms or (3) an acyclic or cyclic diolefin of 3 to 10 carbon atoms. Acidic conditions favor introduction of an unsaturated group into the resorcinol nucleus and further condensation occurs until no unsaturation remains.

Generally, the reaction may be effected between 50 and 150° C. preferably, by adding the unsaturate under acidic conditions to resorcinol. Higher temperatures are preferred because the reaction is completed in a shorter time. The reaction may be carried out by adding the unsaturate to molten resorcinol, but it is generally more convenient to conduct the reaction with the resorcinol in an inert solvent. The use of a solvent aids in mixing the reactants, provides a uniform reaction temperature and permits easy removal of by-products. A number of solvents are suitable reaction media; the only requisites are that the solvent does not react with any of the starting materials or products of the reaction and is easily removed from the final product. Xylene is an excellent solvent for this purpose.

The molar ratio of unsaturate to resorcinol is varied from 0.1 to 2.0 moles per mole of resorcinol and suitable thermosetting resins possessing adhesive properties are obtained. However, it is preferred to maintain an excess of resorcinol, that is, use less than one mole of unsaturate per mole of resorcinol. The lower ratio of unsaturate is preferred because as the amount of reactant increases, the solubility of the resinous product decreases. At low unsaturate ratios a water soluble adhesive is obtained, whereas at high unsaturate ratios a water insoluble but organic solvent soluble adhesive is obtained. The optimum ratio is dependent upon the unsaturate used. However, the preferred resins from the standpoint of both adhesion and water solubility are obtained at unsaturate to resorcinol ratios of 0.5/1 or lower. With a difunctional unsaturate like allyl chloride a ratio of 0.3–0.5 mole of unsaturate per mole of resorcinol is conducive to formation of water soluble products. With a trifunctional unsaturate like dichloro butene a ratio of 0.1–0.3 mole of unsaturate per mole of resorcinol is conducive to formation of water soluble products. When using allyl chloride, the olefin to resorcinol ratio of 0.38/1 appears about optimum. When the olefin is 1,4-dichloro-2-butene, the ratio of 0.18/1 appears optimum. In general 0.1 to 0.7 moles of unsaturate per mole of resorcinol produce water soluble resins and higher proportions produce water insoluble resins but there is some overlapping of the ranges.

According to one embodiment of the invention, the unsaturate-resorcinol polymer is condensed with an aldehyde, for example, formaldehyde. For preparation of products which remain water soluble after reaction with formaldehyde the ratio of unsaturate to resorcinol will be 0.1–0.6 mole per mole of resorcinol. The condensation with formaldehyde is preferably carried out on a reaction product containing unreacted resorcinol. Unreacted resorcinol remains in the reaction mixture when low unsaturate to resorcinol reactant ratios are used. To obtain a formaldehyde condensation product which is soluble in aqueous ammonia, it is essential that unreacted resorcinol be present. If the unreacted resorcinol is removed by distillation prior to adding formaldehyde to the polymer, an insoluble resin is obtained. The condensation of polymer with amounts of formaldehyde, reduced proportionally to the amount of resorcinol removed, still gives an insoluble resin. The condensation of resorcinol with amounts of formaldehyde, which give water-soluble products when condensed with the reaction mixture, also gives insoluble resins. Only by condensing formaldehyde conjointly with resorcinol and the polymer is an aqueous alkaline soluble adhesive obtained. The condensation with formaldehyde improves the fiber bonding properties. For each mole of resorcinol charged for making the polymer there can be used up to 0.5 mole of formaldehyde without significantly reducing the water solubility of the adhesive. A preferred range is 0.3 to 0.4 mole of formaldehyde for each mole of resorcinol charged regardless of the unsaturate, providing of course, the unsaturate is condensed in a ratio conducive to water soluble products.

For the practice of this invention an olefin having at least two reactive sites, one of which is an ethylenically unsaturated bond is required. More specifically, a straight, branched chain, or cyclic di-olefin may be used or, a mono or dihalo-olefin. When using an unsaturate having no halogen present such as di-olefin hydrocarbon it is necessary to add a sufficient quantity of an acid, such as hydrogen chloride, to assure that the reaction is conducted under acidic conditions. When using the halo-olefins no additional acid is required since hydrogen halide is a by-product which maintains acidic conditions in the reaction mixture. An olefin of 3 to 10 carbon atoms is preferred. The addition of other catalysts is not necessary but may be used if desired. Examples of other catalysts are sulfuric acid, acid clay, zinc chloride and cuprous chloride. In the presence of cuprous chloride alkenyl resorcinols form under mild reaction conditions and heating in the presence of resorcinol easily effects an exothermic reaction resulting in formation of the adhesive.

Halo-olefins suitable for the practice of this invention are illustrated by 3-chloropropene, 3-chloro-1-butene, 4-chloro-1-butene, 1-chloro-2-butene, 3-chloro-2-methyl-propene, 3-chloro-1-pentene, 5-chloro-2-pentene, 4-chloro-2-methyl-2-butene, 4-chloro-1-hexene, 6-chloro-1-hexene, 2-chloro-3-hexene, 1-chloro-3-hexene and their halo counterparts in place of chlorine.

Examples of suitable dihalo-olefins are 1,3-dichloropropene, 2,3-dichloropropene, 1,3-dichloro-2-butene, 1,4-dichloro-2-butene, 1,3-dichloro-1-butene, 1,4-dichloro-1-butene, 3,4-dichloro-1-butene, 1,5-dichloro-1-pentene, 1,3-dichloro-1-pentene, 1,3-dichloro-2-pentene, 1,4-dichloro-2-pentene, 1,5-dichloro-2-pentene, 1,3-dichloro-2-methyl-2-butene, 1,6-dichloro-1-hexene, 1,3-dichloro-3-hexene, 1,4-dichloro-2,3-dimethyl-2-butene and their halo counterparts other than chlorine.

It is understood that the halo-olefin reactant must have at least one reactive halogen, preferably an allylic halogen.

Examples of suitable diolefins are propadiene, 1,3-butadiene, 1,3-pentadiene, 2-methyl-1,3-butadiene, 1,5-hexadiene, 2-methyl-1,3-pentadiene, 4-methyl-1,3-pentadiene, 1,7-octadiene, 5,7-dimethyl-1,6-octadiene, 1,5-cyclooctadiene and 1,4-cyclooctadiene.

DESCRIPTION OF PREFERRED EMBODIMENTS

A typical thermosetting unsaturate-resorcinol polymer resin comprising alkylene di-resorcinol units is prepared by slowly adding allyl chloride (3-chloropropene) (0.1 to about 0.7 mole) to an excess (about 1.0 mole) of resorcinol in inert solvent at 100° C. The temperature rises slightly since the reaction is exothermic. Hydrogen chloride evolution is observed as the reaction proceeds. After the addition of allyl chloride is complete, heating of the reaction mixture is continued until HCl evolution ceases. The inert solvent is decanted from the reaction product. Residual solvent and HCl are removed by vacuum stripping. Analysis indicates that essentially no (about 1%) halogen remains in the product and that less than one percent unsaturation remains. The properties of the reaction product indicate that essentially all the hydroxyl radicals of the resorcinol portion of the product remain unchanged, that ether type bonds are absent and that the apparent molecular weight is less than 3000. Molecular weight determinations indicate a range corresponding to polymers containing two and three resorcinol units and a significant proportion of higher polymers. The reaction product is believed to form by polymerization of an alkenyl resorcinol intermediate, the alkylene polymer being terminated by resorcinol. Residual amounts of unreacted resorcinol remaining in the product need not be separated because they have little or no detrimental effect. If a water soluble product is desired after reaction with formaldehyde, it is essential that excess resorcinol be present. The reaction product is still slightly acidic after reaction is completed and it is desirable to neutralize it with a few drops of sodium hydroxide before use. The reaction product can now be used to enhance the bond of cord to rubber.

When added to vinyl-pyridine-styrene-butadiene latex and the cord dipped into the mixture, the reaction product greatly enhances adhesion as compared to cord dipped into the latex alone. Comparable degrees of improvement but much lower absolute values are attained by treating with the reaction product alone. A resorcinol-unsaturate polymer prepared from equal molecular proportions of resorcinol and allyl chloride, ground in a Waring blender in water, washed and dried, is dissolved in acetone to prepare a 10% solution thereof. Polyester cord dipped in the solution gives about 100% improvement in adhesion to rubber as compared to untreated cord.

Alternatively, the reaction product may be further reacted with formaldehyde to form a more highly condensed polymer. After adding the formaldehyde, the adhesive is dissolved in aqueous ammonium hydroxide and is ready for use as a bonding agent for synthetic fiber to rubber.

Water insoluble adhesive adjuvants are produced by reacting approximately 0.7 to 2.0 moles of unsaturate with one mole of resorcinol. After removal of solvent and cooling, a lumpy, reddish-brown solid is obtained. The resulting thermosetting resin is insoluble in water or aqueous ammonia but is readily soluble in organic solvents. It is soluble in methanol, isopropanol, acetone, benzene, xylene, dimethylformamide, dioxane and ethyl acetate. The dissolved reaction product, when applied to synthetic fiber, increases the bond strength between the fiber and vulcanized rubber. It will be appreciated that the adhesive adjuvants of this invention are soluble, i.e. they dissolve in either aqueous medium or organic solvents to form solutions of at least 5% solids.

Known techniques for treating fiber prior to incorporation into rubber are readily adaptable to the improved adhesive compositions of this invention. Two methods commonly used are usually classified as one dip and two dip systems. In the one dip system, according to this invention, alkylene di-resorcinol is added to a conventional resorcinol-aldehyde-latex composition or to a latex composition alone. The fiber is dipped into the composition, heat treated, incorporated into a rubber stock and vulcanized. The two dip system usually comprises dipping the fiber into an improved adhesive solution followed by a heat treating step. The treated cord is then dipped into a conventional resorcinol-formaldehyde-latex composition followed by yet another heat treating step prior to incorporation into the rubber. Obviously, it is advantageous to use a single dip system if equal bonding is achieved. The reason two dip systems are in use is because of incompatibility of components of the separate dip compositions. The adhesive compositions of this invention function satisfactorily in both systems.

The adhesive compositions of this invention may be applied by dipping, spraying, brushing, rolling or other alternative ways to contact the fiber with the adhesive.

The dip method is preferred because present manufacturing facilities are available to perform it.

After application of the adhesive to the cord or fiber, it is advantageous and preferred to heat the treated cord from about one-half minute to 5 minutes in an atmosphere between 250–500° F. It is not exactly known how the heat treatment improves the adhesion. Besides effecting evaporation of solvent, it is believed that the thermal treatment induces further polymerization of the adhesive composition and promotes bond formation between the adhesive and the fiber itself. A stronger bond between the rubber and reinforcing fiber is achieved when the adhesive coated fiber is heat treated.

The invention is further illustrated by the following examples:

EXAMPLE 1

A conventional adhesive dip formulation is prepared by mixing 11 parts of resorcinol, 280 parts of water, 16.5 parts of 37 percent aqueous formaldehyde, 30 parts of 5 percent aqueous sodium hydroxide, 190 parts of 40% solids polyvinyl-pyridine-styrene-butadiene latex. The emulsion is allowed to stand for a day before use. This preparation is called RFL hereinafter.

EXAMPLE 2

An improved adhesive useful in the practice of this invention is prepared in the following manner.

1320 grams (12.0 mole) of resorcinol is added to 2000 ml. of xylene and agitated while heating to 103° C. 270 grams (2.16 mole) of 1,4-dichloro-2-butene is added over a 95 minute period. The reaction temperature is between 102 and 116° C. during the addition. The reaction mixture is then stirred for 2.5 hours between 123–128° C. Hydrogen chloride evolution is observed during this time. The agitation is stopped and the reaction mixture allowed to separate into two layers. The top layer which is xylene is removed. The remaining reaction mixture is vacuum stripped at 150° C. at 45 mm. of mercury to remove residual xylene and hydrogen chloride. The pH is adjusted to 7 or slightly above by the addition of 12 drops of 25% sodium hydroxide solution. 370 grams of 37% aqueous formaldehyde is added over a 57 minute period in which the temperature drops from 126 to 100° C. The reaction mixture is held for another half hour after which a solution containing 370 grams of 28 percent ammonium hydroxide in 2568 grams of water is added. The reaction product is a dark red solution which contains 32 percent solids as determined when evaporated to dryness. The solution is stable in that no separation or solid precipitate is observed after several months storage. This reaction product is ready for use in the preparation of adhesive dip formulations.

EXAMPLE 3

Another adhesive useful in the practice of this invention is made as described below.

183.6 grams (2.4 mole) of allyl chloride is added at 105° C. over an eighty minute period to 660 grams (6.0 mole) of resorcinol in xylene. The reaction mixture is held with stirring between 110–120° C. for two hours. Hydrogen chloride gas evolves during this period. When the gas evolution ceases the agitation is stopped and the reaction mixture separates into two layers. The xylene layer is removed and the other layer is vacuum stripped to 150° C. at 40 mm. pressure of mercury. The intermediate product is neutralized by the addition of a few drops of dilute sodium hydroxide solution. Then 185.4 grams of 37 percent aqueous formaldehyde solution is added in 58 minutes during which time the temperature falls from 130 to 100° C. The solution is stirred for another 17 minutes while the solution cools from 99 to 93° C. At this point, a solution of 185.4 grams of 28 percent aqueous ammonium hydroxide in 1284 grams of water is added. A dark red solution is obtained which has a specific gravity of about 1.09 at 25° C. 2240 grams of the product solution is obtained which can be used directly as an additive for adhesive formulations.

Gas-liquid chromatographic analysis of the reaction mixture during the allyl chloride addition step indicates that ether groups are absent.

EXAMPLE 4

22.5 grams (0.18 mole) of 1,3-dichloro-2-butene is added to 110 grams (1.0 mole) of resorcinol in 200 ml. of xylene over approximately a one-half hour period between 101–113° C. The mixture is heated for approximately four hours at approximately 120° C. The xylene is removed and the reaction mixture is vacuum stripped for approximately one-half hour at 150° C. at 30 mm. Hg to remove residual hydrogen chloride and xylene. After the reaction mixture is neutralized, 30.9 grams of 37% aqueous formaldehyde solution (0.38 mole of formaldehyde) is added over a one-half hour period, the temperature drops from 125 to 102° C. A solution containing 30.9 grams of 28 percent aqueous ammonium hydroxide in 214 ml. of water is added. A dark solution ready for use as cord adhesive is obtained.

EXAMPLE 5

Another resin is prepared by following the procedure of Example 4 except 20 grams of 2,3-dichloro propene is used in place of 1,3-dichloro-2-butene. 354.7 grams of solution is recovered.

EXAMPLE 6

A solution of resin made by the procedure of Example 4 except the xylene solution of resorcinol is first acidified by the addition of anhydrous hydrogen chloride followed by the addition of 56 grams (0.4 mole) of 5,7-dimethyl-1,6-octadiene.

EXAMPLE 7

A soluble polymeric resin is prepared by the procedure of Example 4 except 30.6 grams (0.4 mole) of a technical mixture of chloropropenes is reacted with the resorcinol.

EXAMPLE 8

Another adhesive resin is prepared by the procedure of Example 4 except the xylene solution of resorcinol is first acidified by about 3 grams of HCl and then 22.5 grams (0.2 mole) of 1,7-octadiene is added.

EXAMPLE 9

In this preparation, 36.2 grams (0.4 mole) of methallyl chloride (3-chloro-2-methylpropene) is used in place of 1,3-dichloro-2-butene of Example 4.

EXAMPLE 10

The procedure of Example 4 is followed except 25.0 grams (0.2 mole), 3,4-dicholoro-1-butene is reacted to give a dark amber solution.

EXAMPLE 11

The procedure of Example 8 is followed except the diolefin reactant used is 1,5-cyclooctadiene. A dark blue solution is obtained.

EXAMPLE 12

Another modified - resorcinol - formaldehyde - reaction product is prepared by the procedure of Example 8 except the diolefin reactant is 1,3-pentadiene. The product is a dark blue solution.

The effect which the adhesive compositions of this invention have upon the bond between synthetic fibers, especially polyester and nylon tire cord, and vulcanized rubber is determined by measuring the force required to pull a cord treated with the adhesive from vulcanized rubber in which it is embedded. The test is called an H-test and derives its name from the shape of the rubber-cord article formed in the vulcanization mold. The coated or dipped cord is embedded in rubber which is placed in a conventional H-test vulcanization mold having rubber strip channels ⅜-inch wide by 0.1 inch deep and separated from one another by ¼-inch. The rubber stock used to illustrate the invention consists of a masterbatch containing 50 parts natural rubber, 68.8 parts of oil-extended synthetic styrene-butadiene-rubber, 50 parts carbon black, 2 parts stearic acid and 3 parts zinc oxide. Prior to preparation of the specimen containing the embedded cords and vulcanization of the product, 1 part sulfenamide accelerator and 2 parts sulfur are milled into the masterbatch.

The test specimens are placed in the mold and heated at 153° C. for 35 minutes to obtain optimum cure. The test specimens are removed, cooled to room temperature and permitted to relax or to set for 24 hours. The specimens are then heated to 100° C. An unaged specimen is one which is heated for one hour before the force to separate the cord from the rubber is determined at 100° C. An aged specimen is one which has been heated for 24 hours before measuring at 100° C. the strength of the bond between the cord and the vulcanized rubber. The force required to separate a cord from the rubber in a H-test specimen is determined by use of an Instron tensile tester with a jaw speed of the tester moving at the rate of 5 inches per minute.

A single dip adhesive composition is prepared by mixing 11 parts of the reaction product described in the examples, 7 parts water and 18 parts of the RFL described in Example 1. Lengths of 1000/2 polyester tire cord are dipped into a solution prepared as described. the cord is dried and heated for 3 minutes at 450° F. The cord is placed in rubber and prepared into H-test specimens. The force required to separate the cord from the rubber is measured and recorded. The values obtained are shown in Table I.

TABLE I.—H-TEST

| | Force, lbs. | |
|---|---|---|
| | Unaged | Aged |
| Adhesive: | | |
| RFL alone | 14.0 | 13.6 |
| Product of example: | | |
| 2 | 19.8 | 17.5 |
| 3 | 16.3 | 14.5 |
| 4 | 18.8 | 15.8 |
| 5 | 14.7 | |
| 7 | 20.5 | 23.3 |
| 8 | 15.9 | 18.1 |
| 9 | 15.2 | 16.7 |

Another single dip adhesive composition is prepared by mixing together 9.2 parts of the reaction product obtained as described in the examples with 20.4 parts of about 40% solids vinyl-pyridine-styrene-butadiene terpolymer latex and 22.4 parts water. The adhesive composition so formulated may be used without aging. Polyester 1000/3 tire cord is dipped into the composition at the rate of 52 inches per minute. The dipped cord is heat treated for 3 minutes at 450° F. The treated cord is then embedded in H-test specimens and tested as previously described. The force required to separate the cord from the vulcanized rubber is shown in Table II.

TABLE II.—H-TEST

| | Force, lbs. | |
|---|---|---|
| | Unaged | Aged |
| Adhesive: | | |
| Vinyl-pyridine-styrene-butadiene latex alone | 8.0 | 7.3 |
| Product of example: | | |
| 2 | 19.9 | 20.2 |
| 3 | 20.4 | 20.7 |
| 4 | 16.8 | 18.4 |
| 5 | 19.5 | 20.9 |
| 6 | 19.2 | 20.6 |
| 7 | 15.8 | 16.6 |
| 8 | 15.6 | 16.4 |
| 10 | 24.3 | 20.1 |
| 11 | 22.5 | 19.5 |
| 12 | 22.7 | 22.5 |

The following examples illustrate the preparation of the compositions excluding the step of reacting with an aldehyde. The composition so prepared when added to a styrene-butadiene-vinyl-pyridine latex significantly enhances the adhesion between rubber and cords treated with the adhesive mixture.

EXAMPLE 13

30.9 grams of allyl chloride is added dropwise in 40 minutes to 110 grams (1.0 mole) of resorcinol in 2000 ml. of xylene at 110° C. The reaction mixture is heated between 108–118° C. for an additional two hours. The mixture is allowed to stand overnight while cooling to room temperature. The xylene layer is decanted and residual solvent is stripped by heating to 150° C. under 25 mm. pressure. The product is cooled to 100° C. and 250 ml. of water is added. After cooling to room temperature, a dark amber solution is obtained. 30 grams of the product so described is added to 20 grams of about 40% solids content of butadiene-styrene-vinylpyridine latex. A 1000/3 polyester tire cord is dipped into the adhesive formulation and is heated for 3 minutes at 450° C. The cord is then embedded into rubber and vulcanized as previously described. The unaged H-adhesion test requires 10.5 pounds to separate the cord from the rubber. The aged H-test value is 11.8 pounds. An identical cord is dipped into the reaction product alone and then dipped into the latex alone followed by the same heat treatment. The H-values obtained are 13.3 pounds on the unaged sample and 13.7 pounds on the aged sample.

EXAMPLE 14

The procedure of Example 13 is repeated with the exception of 25 grams of 1,4-dichloro-2-butene is used instead of allyl chloride. Cord specimens are given the two dip treatment described in Example 13 except using the product of this example. H-test results are 15.4 and 15.3 pounds for unaged and aged samples, respectively.

EXAMPLE 15

The procedure of Example 13 is repeated using 36.2 grams (0.4 mole) of 3-chloro-2-methyl propene (methallyl chloride) in place of allyl chloride. Cord specimens treated with an adesive composition containing both the reaction product and latex (single dip) gives 14.9 pounds (unaged) and 15.4 pounds (aged). The specimens first dipped into the reaction product followed by dipping the latex give values of 12.5 pounds (unaged) and 13.3 pounds (aged).

EXAMPLE 16

22.0 grams (0.2 mole) of 1,5-cyclooctadiene is added dropwise over a 45 minute period to a solution of 110 grams (1.0 mole) resorcinol and 3 grams of anhydrous hydrogen chloride in 200 ml. of xylene at 100° C. The reaction mixture is heated for about 5 hours between 110–125° C. and then cooled overnight. The xylene layer is decanted and the residual xylene vacuum stripped (17 mm.) at 150° C. 214 ml. of water is added after cooling to 110° C. The unsaturate-resorcinol reaction product is a dark red solution. Polyester fibers are treated using this product in the one dip method described in Example 13. H-test values are 17.4 pounds (unaged) and 18.9 pounds (aged). A portion of the reaction product is further reacted with formaldehyde as previously described. Polyester fiber treated with this resin in the one dip method gives H-test values of 22.5 pounds (unaged) and 19.5 pounds (aged).

EXAMPLE 17

The procedure of Example 16 is followed except 27.2 grams (0.4 mole) of 1,3-pentadiene is used in place of the 1,5-cyclooctadiene. The unsaturate-resorcinol product is a dark amber to brown solution. Polyester fiber dipped into the product about and placed in rubber required twice the force to separate the fiber from rubber than needed for an untreated fiber. Tire cords treated using the one dip treatment described in Example 13 except using the adhesive of this example give H-test values of 18.5 and 18.0 pounds. A portion of the reaction product is further reacted with formaldehyde as previously described. Polyester fibers treated with this resin in the one dip method give H-test values of 22.7 pounds (unaged) and 22.5 pounds (aged).

A solution of 220 grams (two moles) of resorcinol in 400 ml. of xylene is prepared and heated to 100–120° C. Allyl chloride is then added and after the reaction is complete, the xylene is removed by pouring off the excess and heating, in vacuo, the reaction mixture which remains. The residue is analyzed by gel permeation chromatography and portions thereof washed with water to remove unreacted resorcinol and employed as adhesives. A summary of three preparations in which allyl chloride varied is as follows:

| Allyl chloride | Feed time, hrs. | Total heating time, hrs. | Wt. of reaction product, grams |
|---|---|---|---|
| 1 mole | (¹) | 4 | 200 |
| 2 moles | 3 | 5.5 | 256 |
| 3 moles | 5 | 8.5 | 299 |

¹ 85 minutes.

The molecular weight distribution before water washing is summarized below:

| Allyl chloride | Percent apparent | | | | Avg. M.W. |
|---|---|---|---|---|---|
| | M.W. <180 | M.W. 232 | M.W. 456 | M.W. 675 | |
| 1 mole | 2 | 40 | 26 | 17 | 15 (1,000) |
| 2 moles | 3 | 28 | 19 | 16 | 34 (1,200) |
| 3 moles | 4 | 15 | 13 | 13 | 55 (1,500) |

The reaction products essentially free of resorcinol are dissolved in acetone to form a solution of 10% concentration and polyester cord dipped therein followed by dipping the cord in RFL and heating the twice dipped cord for 3 minutes at 450° F. Adhesion is then evaluated by the H-test in the manner described. Cord treated with RFL alone is used as a control.

Moles of allyl chloride used
in making the adhesive:                Force, lbs.
 1 ---------------------------------------- 18.6
 2 ---------------------------------------- 19.0
 3 ---------------------------------------- 17.5
 Control ----------------------------------  9.6

Examples using polyester cord illustrate the invention. However, equally good adhesion is obtained when the process is used with rayon and nylon fibers.

The affect of formaldehyde on the molecular weight is illustrated by comparison of products A and B described below.

PRODUCT A

A product is prepared according to Example 13 from 30.6 grams of allyl chloride and 110 grams of resorcinol except that the allyl chloride is added over a period of about an hour and a half, the reaction mixture is heated for an additional 5 hours at 100–110° C. and, after decanting the xylene layer, residual xylene is removed by heating in vacuo to 155° C. under 30 mm. Hg pressure.

PRODUCT B

A formaldehyde condensate is prepared from the condensation product of allyl chloride and resorcinol in similar ratio according to Example 3. The allyl chloride, 918 grams (12 mole), is added to 3300 grams (30 mole) of resorcinol at 100–118° C. over a period of about 2 hours. The reaction is heated and stirred for an additional 5½ hours at which time the temperature is 134° C. After decanting the xylene layer, residual xylene is removed by heating in vacuo to 145° C. under 12 mm. Hg pressure. The intermediate is neutralized with a little sodium hydroxide and to it added 927 grams of 37% formaldehyde at about 100° C. over a period of 1¼ hours. The solution is stirred for an additional ¾ hours at which time the temperature is 86° C. A solution of 927 grams of concentrated ammonium hydroxide and 6420 grams of water are added to produce 11,636 grams of a dark amber solution.

MOLECULAR WEIGHT DISTRIBUTION

| | Percent apparent | | | |
|---|---|---|---|---|
| | M.W. <180 | M.W. 232 | M.W. 456 | M.W. >800 |
| Product: | | | | |
| A | 13 | 40 | 16 | 11 |
| B | 2.7 | 11 | 13 | 45 |

The weight average MW of Product A is 438 and that of Product B 821.

The adhesives of this invention give excellent adhesion values in HRH rubber stocks. HRH stocks according to this invention contain the same ingredients as in the masterbatch previously described except 35 parts of carbon black are used with 15 parts precipitated silica, 2.5 parts resorcinol and 1.6 parts hexamethylenetetramine. It is known that rubber stocks containing silica, resorcinol and a formaldehyde donor bond untreated synthetic cord to rubber, however, the system is not satisfactory for polyester cord. Polyester cord treated with the adhesives of this invention are effectively bonded in HRH stocks. The best adhesion values are obtained for cord dipped into an adhesive composition comprising the unsaturate-resorcinol polymer and vinyl-pyridine-styrene-butadiene latex. The H-test results are shown in Table III.

TABLE III.—H-TEST OF HRH STOCKS

| | Force, lbs. | |
|---|---|---|
| | Unaged | Aged |
| Untreated polyester cord | 5.0 | 3.4 |
| Vinyl-pyridine-styrene-butadiene latex treated cord | 18.3 | 19.6 |
| Cord treated with product of Example 3 alone | 23.4 | 21.1 |
| Cord treated with adhesive composition comprising product of Example 3 and vinyl-pyridine-styrene-butadiene latex | 35.5 | 30.4 |

The polymers of this invention can be used to improve adhesion of treated fibers to diene rubber. Diene rubber includes both natural and synthetic rubber. Illustrative examples of synthetic rubber which may be used in this invention include cis-4-polybutadiene, butyl rubber, ethylene-propylene polymers, polymers of 1,3-butadiene, polymers of isoprene and copolymers of 1,3-butadiene with other monomers, such as styrene, acrylonitrile, isobutylene and methyl methacrylate.

Although formaldehyde is used to illustrate the invention and is preferred, it is understood that other aldehydes are suitable for the practice of the invention. The saturated aliphatic aldehydes having straight or branched chains of 1 to 6 carbon atoms are applicable. The unbranched lower alkyl aldehydes of 1 to 4 carbon atoms are an important subgroup; examples of which are acetaldehyde, propionaldehyde and butyraldehyde. The cyclic aldehydes and polymerized aldehydes such as paraformaldehyde and paraldehyde may also be used.

The adhesives or adhesive adjuvants of this invention may be applied to other fibers than those particularly mentioned above to aid in bonding fibers to rubbers. Other fibers which can be employed in the practice of the invention include, but are not limited to, cotton, wool, wood cellulose, glass, aluminum, copper, tin, steel, brass plated steel and aluminum-steel alloys. For example, the preparation of aluminum-steel alloy fibers and stainless steel fibers useful for making reinforced rubber articles to which fibers the adhesive or adhesive adjuvants of this invention may be applied is described in British Pat. 1,153,577, May 29, 1969. The individual metal filaments are about 3-6 mls. in diameter and are usually twisted into strands and then converted to metal cord or cable for reinforcing flexible rubber articles. The composition of a typical steel alloy comprises 0.5-3.0 percent aluminum and 0.1-1.5 percent carbon. If desired the metal cord is treated with a metal primer prior to applying the adhesive of this invention. Alternatively, water soluble primers are added directly to the adhesive compositions and applied as a single dip.

For metal-rubber adhesion the adhesive or adhesive adjuvants are generally used in combination with a rubber latex. Vinyl-pyridine latexes appear to be particularly advantageous but natural and synthetic rubber latexes are also useful. Adhesion values from 30 lbs. to above 50 lbs. can be obtained in the "H" test depending upon the cleanliness of the metal surface, composition of the adhesive composition, relative amounts of each component, the thermosetting conditions to which the treated cord is subjected and the composition of the rubber stock itself.

For consistent performance, the adhesive is deposited upon a clean metal surface. The metal surface may be cleaned mechanically, chemically or by a combination mechanical-chemical treatment. The procedure used depends upon the nature of the surface contamination. If the surface is contaminated with dust, dirt, lint and other extraneous material due to an unclean environment, sometimes simply wiping is adequate. If the surface is covered with oils, greases and organic materials, liquid or vapor degreasing is recommended. When scale or films on the surface is a problem, treatment with either acid or alkaline solutions or both may be required to provide a clean surface. Although adequate adhesion is usually obtained without any cleaning of the metal surface, cleaning is preferred as a precautionary measure to assure uniformly good results and to eliminate adhesion failure due to accidental contamination of the metal surface.

The ratio of components in adhesive compositions for treating metal surfaces may be varied and good metal-rubber adhesion achieved. The major component is water with the balance comprising rubber latex, adhesive adjuvant, and if desired, one or more other additives such as metal primer, antioxidant and wetting agent. For example, the total percent solids of the adhesive composition (the amount of residue of both soluble and insoluble components obtained upon evaporation of the water) may range from 20-40%. Preferably, the solid content is between 25-35%. Of course, it is understood that the invention is not limited to any particular solids content and that the above ranges are merely illustrative of typical formulations which give good adhesion. The total solid content of the composition generally comprises 30-75% elastomer from latex, preferably 40-60% and 20-60% adjuvant of this invention, preferably 30-40%. Lower amounts of adjuvant, preferably no lower than 10%, may be used when the composition contains other additives. The amount of each for optimum adhesion varies somewhat depending upon the type latex and adjuvant used.

As indicated, metal primers have been described which enhance metal to rubber bonding and may be added to the composition. The metal primer may comprise 0-50% of the total solids in the composition but generally for best results 15-45% is recommended. In addition, wetting agents may be included to enhance the coverage of the surface with the adhesive composition by reducing the surface tension of water. Ionic and nonionic surfactants are suitable for this purpose. Polyethylene oxide derivatives, polyvinyl acetate, sodium lauryl sulfate, cetyl pyridinium chloride, dodecylbenzenesulfonate, esters of sodium sulfosuccinic acid, sodium salts of sulfated mono- glycerides, and quaternary ammonium salts of alkylamine may be used. Generally, amounts up to about 1% of the total composition are satisfactory.

Any of the metal adherents (primers) may be used in the preparation of the adhesive coated steel fiber of this invention, however, it is generally preferred to select an adherent which is water soluble. A large class of known metal adherents comprise resins prepared by the catalytic condensation of phenols with an aldehyde. Acid or caustic catalyzed resins may be used but resols prepared by caustic condension are preferred since these resins are more compatible with latex and possess thermosetting properties which enhances adhesion upon heating. Monohydric and dihydric phenols and alkylated phenols wherein the phenol has one or more alkyl radicals attached to the benzene ring are commonly used. Formaldehyde is by far the most frequently used aldehyde reactant but aldehydes of 1-6 carbon atoms are suitable. Lower molecular weight resins having only two or three benzene ring per polymer unit are preferred, especially when water soluble resins are desired.

The phenol-aldehyde resol resins applicable to the preparation of adhesive treated steel fiber of this invention are caustic catalyzed condensation products of formaldehyde and phenol. Resins prepared by reacting 0.9-1.8 mole of formaldehyde per mole of phenol are suitable with 1.2-1.6 moles of formaldehyde being preferred. The resin illustrated hereinafter is the product of the condensation of 1.4 mole of formaldehyde and phenol in the presence of sodium hydroxide. The caustic is neutralized with an acid to form an insoluble salt which is removable by filtration. The resin is characterized by a molecular weight range of 130 to about 250 with the number average molecular weight of 150. Resins of this type are available under the trademark Resinox. The resol is of course distinct from the new resorcinol derived adhesive and adhesive adjuvants. It will be appreciated that a polymer comprising alkylene di-resorcinol units derived from di and tri-functional unsaturates will have the resorcinol nuclei attached to different carbon atoms of the alkylene bridge so that the nuclei are separated by at least two carbon atoms. Alkylene bridges of two to eight carbon atoms in the chain between the aromatic nuclei are similarly effective although the bridge may contain up to ten carbon atoms because pendant alkyl groups may be present in the alkylene bridge. Functional groups other than the desired reactive sites are preferably absent from the reactant with which resorcinol is condensed. The acyclic or cyclic diolefins are preferably hydrocarbon and the olefin group attached to another reactive site is preferably hydrocarbon.

Adhesive compositions are prepared by blending various proportions of the following materials. (1) A vinyl-pyridine latex of about 40% solids content. The vinyl-pyridine latex is a terpolymer prepared by the polymerization of butadiene/vinyl-pyridine/styrene usually in proportions of 70/15/15 and is available under the trademark of Gen-Tac and Pliolite. The adhesion to metal and to rubber varies from latex to latex and is further variable depending upon other components in the formulation. (2) Alkaline aqueous solutions of the adhesives of this invention as described in Examples 2-12 having about 30% solids content. (3) Water which is added to adjust the total percent solid content of the composition and optionally (4) phenol-aldehyde resin previously described of about 66% solid content.

The metal cord is cleaned by dipping into an alkaline solution at 60° C. for about one-half minute and then rinsed in water for about one-half minute. The cleaning solution comprises about a 5% sodium carbonate solution containing a small amount of a detergent. After cleaning but before the cord dries, it is dipped into the adhesive compositions. It is important to cover the metal surface as soon as possible since the clean metal is highly active and readily rusts upon standing. After the cord is dipped in the adhesive composition, the coated cord is heated as described previously. A steel cord, whether cleaned or not, when dipped into the adhesive composition and subsequently heat treated absorbs solids between about 1–4% by weight of the cord. The adhesive coating is flexible and strongly adherent and the steel cord-adhesive assembly is stable to conventional handling conditions and incorporation into elastomeric matrix.

To illustrate adhesion to a matrix, a rubber composition containing the following ingredients is compounded where all parts are by weight. 100 parts natural rubber, 50 parts HAF carbon black, 5 parts zinc oxide, 3 parts stearic acid, 3 parts hydrocarbon softener, 2.5 parts polymerized 1,2 - dihydro - 2,2,4 - trimethylquinoline, 3 parts insoluble sulfur, 0.8 parts 2 - (morpholinothio) benzothiazole and 0.5 parts N - (cyclohexylthio)phthalimide. The coated cords are heated for two minutes at 212° F. and then for four minutes at 356° F. and embedded in said rubber composition and the composite is placed in an H-test vulcanization mold as previously described, cured for 30 minutes at 153° C. and the force required to separate the cord from the rubber is determined as before. Typical results obtained for cleaned aluminum-steel alloy 4 x 7 x 0.004 cord comprising 28 individual 4 mil diameter filaments in the form of a cable of 4 strands of 7 filaments each are shown in Table IV. The dip compositions are prepared by mixing the indicated components (all parts by weight) to 4.0 parts of vinyl-pyridine latex as described above and 4.0 parts water. Dip A shows the adhesion value with latex alone.

TABLE IV

| Dip | Adjuvant of Example 3 | Phenol-aldehyde resin | Force, lbs. Unaged | aged |
|---|---|---|---|---|
| A |  |  | 10 | 11 |
| B | 2.0 |  | 33 | 25 |
| C | 4.0 |  | 40 | 32 |
| D | 4.0 | 1.2 | 39 | 29 |
| E | 4.0 | 2.4 | 40 | 30 |
| F | 2.0 | 1.2 | 42 | 35 |
| G | 2.0 | 2.4 | 45 | 32 |

It is understood that the fiber may be treated sequentially with primer, adhesive and latex, or with primer and a combination of adhesive and latex, or if desired a combination comprising primer, adhesive and latex. Generally, to eliminate processing steps, it is convenient to treat the fiber in one step by using a combination of adhesive and latex, or a combination of primer, adhesive and latex.

A quantity of the above cord is treated with an adhesive composition comprising 15 parts vinyl-pyridine latex, 10 parts of adjuvant of Example 3, 10 parts water, 3 parts phenol-aldehyde resin and 1 part of a 50% aqueous dispersion of polymerized 1,2 - dihydro - 2,2,4 - trimethylquinoline and subjected to a heating step on a Litzler tire cord treating machine. A polyester-bias ply belted tire is constructed with the treated steel cord as the reinforcement member of the belt. The tire has sufficient performance characteristics to pass the DOT test for on-the-road passenger car tires.

Similar but not identical adhesion values as shown above are obtained when using other adjuvants of this invention. Carbon-steel wire 2 x 6 x 0.005 treated with the above adhesive composition gives over 30 lbs. in the "H" test. Debrassed commercial tire cord 1 x 5 x 0.01 gives adhesion values of above 45 lbs. Cables of fine diameter aluminum wire treated in the above manner cannot be pulled from the rubber in the "H" test since the rubber-metal bond exceeds the tensile strength of the cable and the cable breaks prior to separation. Excellent adhesion values are obtained also on phosphatized-steel wire cords.

Extended Disclosure

For the practice of this invention, any olefinic-reactant which introduces an unsaturated radical of 3–10 carbon atoms into the nucleus of the resorcinol which unsaturated radical further condenses producing saturated resorcinol polymer having alkylene bridges of at least two carbon atoms is suitable. In addition to unsaturates previously disclosed, suitable unsaturate-resorcinol polymers characterized by resorcinol units connected by alkylene bridges may also be prepared by the acidic condensation of resorcinol and olefinic alcohols or olefinic alcohol precursors. Branched or unbranched olefinic alcohols of 3 to 10 carbon atoms having at least two reactive sites are satisfactory. A difunctional alcohol is an alcohol having one hydroxy radical as one reactive site and an olefinic bond as the other. A trifunctional alcohol may have either two hydroxy radicals and one olefinic bond or one hydroxyl radical and two olefinic bonds. It is believed that the unsaturate-resorcinol polymers are the same regardless of whether the alkylene bridge is derived from a halo-olefin, diolefin or an olefinic alcohol. Representative examples of unsaturated alcohols which are satisfactory unsaturate reactants are allyl alcohol, methallyl alcohol, crotyl alcohol (2 - buten - 1 - ol), cinnamyl alcohol, 1,5 - dimethyl - 4- hexen - 1 - ol, 1 - methyl - 2 - buten - 1 - ol, 3 - hexen - 1- ol, 4,6 - dimethyl - 1 - hepten - 4 - ol, 3 - octen - 1 - ol, 2,2 - dimethyl - 3 - hexen - 1 - ol, 3,7 - dimethyl - 6 - octen- 1 - ol, 3,7 - dimethyl - 2,6 - octadiene - 1 - ol, 3,7 - dimethyl - 1,6 - octadiene - 3 - ol and 3-(4 - hydroxy - 3-methoxy-phenyl)-2-propen-1-ol(coniferyl alcohol).

The term olefinic alcohol precursor means unsaturated esters or unsaturated ethers which upon acid hydrolysis yield olefinic alcohols. Formate, acetate, propionate and butyrate esters of any of the above illustrated unsaturated alcohols are satisfactory, for example, allyl formate, allyl acetate, allyl propionate, methallyl acetate, crotyl acetate, and the like. Symmetrical and unsymmetrical ethers are satisfactory provided that the ether gives two moles of the same or different unsaturated radical when introduced into the resorcinol nucleus. Illustrative examples of satisfactory ethers are allyl ether, bis(2 - methylallyl)ether, allyl - 3 - methyl - 3 - butenyl ether and 2 - butenyl - 1-methylallyl ether. It is understood that the invention is not limited to the unsaturate reactants disclosed for illustrative purposes but that the invention is applicable to any olefinic alcohol of 3 to 10 carbon atoms or olefinic alcohol precursor which yields said alcohols of 3 to 10 carbon atoms. Further examples would only unduly extend the disclosure without contributing to a better understanding of the invention. Many olefinic alcohols and alcohol precursors are known and may be readily found in the literature.

The mole ratio of unsaturate-to-resorcinol is the same for olefinic alcohols and alcohol precursors as other unsaturate reactants previously discussed. When producing water soluble products the ratio of difunctional alcohols to resorcinol may be larger than when a trifunctional alcohol is the unsaturate. And as before, in the preparation of resins which remain water soluble after reaction with formaldehyde the unsaturate-resorcinol ratio is 0.1– 0.6 mole per mole of resorcinol. When using trifunctional and higher molecular weight unsaturates preferably the ratio is within the range of 0.1–0.3. For polymers with allyl bridging groups, preferred formaldehyde ratio is between 0.3 to 0.5 mole of formaldehyde for each mole of resorcinol charged. For all unsaturates, water soluble resins are produced with about 0.2 to 0.7 mole of formaldehyde for each mole of resorcinol charged providing that the unsaturate is condensed in a ratio which gives water soluble resins. It is understood that there is some overlapping of the range of reactant ratios of formaldehyde and unsaturate in which water insoluble products are obtained, however, generally if the sum of the moles of formaldehyde and unsaturate per mole of resorcinol charged is between about 0.5 to about 1.0, water soluble resins are obtained.

It will be appreciated that the solubility of the alkylene di-resorcinol polymer and the aldehyde condensate is dependent upon molecular weight. The molecular weight of the polymer varies according to the amount of unsaturate condensed to form the alkylene bridged resorcinol. As expected, when the amount of unsaturate increases higher molecular weight polymers are obtained. The molecular weights are determined by Gel Permeation Chromatography using four 3-ft. x ⅜-inch diameter Poragel columns (2–500 A., 100 A. and 60 A.) and tetrahydrofuran solvent. The molecular weights are those of the polymer or condensate and do not include species below an apparent molecular weight of 300. If the number average molecular weight of the polymer exceeds 800 and the weight average molecular weight exceeds 1200 water insoluble resins are obtained when condensed with aldehyde. The number average molecular weight of alkylene resorcinol polymer conducive to the formation of water soluble adhesive is between 450–750, with the range of 500–650 being preferred and the weight average molecular weight is between 500–1200 with the range of 700–900 being preferred.

After condensation with formaldehyde, water soluble condensates generally have the number average molecular weight between 700–1800 with the range of 800–1300 being preferred and have the weight average molecular weight between 900–10,000 with the range of 1500–4500 being preferred. Better adhesion is obtained with condensates having higher molecular weights. As already explained, the proper molecular weight condensates are obtained by controlling the mole ratio of unsaturate and formaldehyde condensed. The preparation of unsaturate-resorcinol polymers from olefinic alcohols and precursors are illustrated below.

EXAMPLE 18

A reactor equipped with heating and stirring means is charged with 110 grams of resorcinol, 5 ml. of water and 0.5 grams of concentrated sulfuric acid. After heating the mixture to 110° C. allyl alcohol (23.2 g.) is added slowly over a period of 35 minutes during which time the temperature drops to 105° C. The mixture is heated with stirring at 105–120° C. for about three hours. Dilute sodium hydroxide solution (2 g. of 10% solution) is added to neutralize the acid. Formaldehyde (30.8 g. of 37% solution) is added over a 25 minute period while the temperature decreases from 120 to 94° C. After one-half hour, an ammonium hydroxide solution prepared by dissolving 30.6 grams of concentrated NH$_4$OH in 214 ml. of water is added. A dark solution (414 g.) is obtained which solution is suitable for use in the preparation of adhesive formulations. The number average molecular weight of the products is 941 and the weight average molecular weight is 2100. The procedure is repeated omitting the caustic neutralization step of the acid catalyst; the product has a slightly lower molecular weight but gives essentially the same adhesive values.

EXAMPLE 19

Allyl acetate (40 g.) is added dropwise over a period of 50 minutes at a temperature of 108–125° C. to a mixture comprising 110 grams of resorcinol, 5 ml. of water and 0.5 g. of concentrated sulfuric acid. The mixture is stirred and heated at about 120° C. for 7 hours. The mixture is vacuum stripped at 150° C. at 16 mm. Hg to remove the by-product acetic acid (a 28 grams loss in weight is observed). Formaldehyde (30.6 g. of 37% solution) is added dropwise at 120° C. over a period of 33 minutes. During the addition, the temperature falls to 102° C. The solution is held for ½ hour after which a solution containing 30.6 grams of concentrated NH$_4$OH in 214 grams of water is added. The product is a dark solution which weighs 412 grams. The number average molecular weight of the product is 813 and the weight average molecular weight is 1583. In a duplicate experiment, the saturated polymer intermediate has the number average molecular weight of 537 and the weight average molecular weight of 682.

EXAMPLE 20

A reactor charged with 110 grams of resorcinol is heated to 100° C. The acid catalyst is added (1.0 g. conc. H$_2$SO$_4$) and allyl ether (19.6 grams, 0.2 mole; equivalent to 0.4 mole of allyl alcohol) is added dropwise over a period of 28 minutes while maintaining the temperature between 107–121° C. The mixture is stirred between 113–123° C. for about 1¾ hours. Formaldehyde (30.8 g. of 37% solution) is added dropwise over a period of one-half hour. During the addition, the temperature drops from 117 to 100° C. The mixture is held for one-half hour at about 100° C. after which a solution containing 30.8 grams of concentrated NH$_4$OH in 214 grams of water is added. A yield of 402 grams of adhesive solution is obtained. The number average molecular weight of the saturated resorcinol polymer intermediate is 588 and weight average molecular weight is 764. The number average molecular weight of the product is 964 and weight average molecular weight of the product is 2578.

EXAMPLE 21

A reactor is charged with 110 grams of resorcinol, 200 ml. of xylene and 2.5 grams of anhydrous HCl. After heating to 100° C., 30.8 grams of geraniol is added dropwise over 55 minutes. The mixture is heated between 104–120° C. for about three hours. The xylene is decanted and the residual xylene is removed by vacuum stripping at 170° C. at 10 mm. Hg. Fifteen drops of 10% sodium hydroxide is added to neutralize the acid catalyst. Formaldehyde (30.9 g. of 37% solution) is added dropwise over a period of one-half hour during which the temperature drops from 128–96° C. The mixture is heated for another hour at about 90° C. A solution containing 30.9 grams of concentrated NH$_4$OH in 214 grams of water is added to yield 390 grams of a dark amber solution. When the procedure is repeated except with 0.4 moles of geraniol, an insoluble resin is obtained.

The soluble saturated resorcinol polymer prepared via mono-olefinic alcohol or alcohol precursors in Examples 18, 19 and 20 give essentially identical NMR and infrared spectral patterns as the polymers prepared via halo-olefin unsaturates, providing, of course, the unsaturates give the same bridging group. NMR analysis show at 1.1–1.5 p.p.m. 2.2–3.2 mmoles of methyl groups per gram of sample depending upon the amount of unsaturate reacted. The IR measurements are made on films of the materials cast from solutions on NaCl disks using a Perkin-Elmer Model 621 IR Spectrophotometer; slit program, 1000; scan speed, 1.9 inches/min.; attenuator speed 1480 and suppression 3. The absorbance of 3330 cm.$^{-1}$ is corrected by subtracting the baseline at 3700 cm.$^{-1}$. The absorbance at 1600 cm.$^{-1}$ and 1455 cm.$^{-1}$ is corrected by subtracting the absorbance at 1540 cm.$^{-1}$ from each. The aliphatic to aromatic ratio measured to 1455 cm.$^{-1}$ and 1600 cm.$^{-1}$, respectively is 0.45±0.1 and the hydroxy to aromatic ratio measured at 3330 cm.$^{-1}$ and 1600 cm.$^{-1}$, respectively, is 1.0±0.15. No carbonyl bands are observed which indicates that no oxidation of the polymer occurs during the synthesis.

EXAMPLE 22

Resins are prepared by adding dropwise over a period of 50–90 minutes 43.5 g. of allyl alcohol to a mixture comprising 110 g. of resorcinol and 1–8 g. of acid catalyst (conc. HCl or H$_2$SO$_4$). The mixture is heated at 100–120° C. for 2–4 hours. When HCl is used as catalyst, the reaction mass is vacuum stripped at about 150° C. and 30 mm. Hg. When H$_2$SO$_4$ is used, the reaction mass is neutralized by caustic addition. Brittle resins are obtained (yield 125–145 g.) having a number average molecular weight between 700–850 with the higher molecular weight products obtained when larger quantities of catalyst are used. The resins contain about 17–24 percent free resorcinol.

Polyester cords dipped into 10% acetone solutions of the resins followed by an RFL dip give adhesion values comparable to those obtained with resins using allyl chloride as the unsaturate.

The water insoluble saturated polymers of this invention prepared by condensation of higher ratios of unsaturate may be dispersed in water or latex compositions which dispersions are suitable for treating fiber to enhance adhesion to rubber. Adequate dispersions are obtained by mixing the resin with water in a high speed mixer, for example, a Waring Blender. The fiber is dipped into the dispersion, incorporated into rubber and the composite vulcanized. Better adhesion is obtained if a methylene donor is present in the rubber stock. It is preferred, particularly with natural rubber stocks, to include silica in the vulcanizable composition. It is particularly advantageous to treat discontinuous fibers with the aqueous resin dispersion since the short fibers may be blended with the dispersion and the treated fibers recovered by filtration. Rayon or nylon short fibers treated in this manner and incorporated in the aforesaid rubber stocks give high strength vulcanizates which is indicative of good bonding. Vulcanized rubber composites prepared with wood-cellulose fibers treated with the resin dispersion exhibit properties which indicate that extraordinarily good bonding is achieved. Polymers prepared by reaction of one mole of allyl chloride per mole of resorcinol and the resins of Example 22 are examples of saturated polymers which are suitable for the preparation of adhesive dispersions.

An adhesive formulation is prepared by combining 15 parts vinyl pyridine latex, 10 parts water, 3 parts phenol-formaldehyde resin, 1 part of 50% aqueous dispersion of polymerized 1,2-dihydro-2,2,4-trimethylquinoline and 10 parts of adjuvant. Clean aluminum-steel alloy 4 x 7 x .004 cord dipped in adhesive formulation prepared with the adjuvants of Examples 18–21 gives H-test adhesion values of 40–50 pounds.

Adhesive dip formulations are prepared as described in Table I. Compositions prepared using the adjuvants of Examples 18–21 give higher adhesion values than obtained for compositions using RFL alone. The improved adhesion values are essentially the same as obtained from compositions prepared from the allyl chloride product.

A high solids content adhesive dip formulation is prepared by mixing 16.5 parts of resorcinol, 130.5 parts of water, 14.7 parts of 37 percent aqueous formaldehyde, 27.0 parts of 5 percent aqueous sodium hydroxide and 240 parts of 40% solids polyvinyl-pyridine-styrene-butadiene latex which latex was from a different source than the latex used in Example I. The emulsion is allowed to stand for a day before use. This preparation is called RFL II hereinafter.

A single dip adhesive composition is prepared by mixing 17.15 parts of adjuvants, 6.2 parts water and 26.65 parts of RFL II. Lengths of 1000/3 polyester tire cord are dipped into a solution prepared as described. The cord is heat treated and prepared into H-test specimens using the rubber compositions and methods of Table I. The adhesion values obtained in the H-test are shown in Table V.

TABLE V

| Adhesive: | Force, lbs. unaged |
|---|---|
| RFL II alone | 22.6 |
| Adjuvant of Example 3 | 26.3 |
| Adjuvant of Example 18 | 27.8 |
| Adjuvant of Example 19 | 27.1 |
| Adjuvant of Example 20 | 30.6 |

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. An aqueous alkaline solution of at least 5% solids of adhesive or adhesive adjuvant for bonding fiber to rubber comprising the conjoint condensate of (1) resorcinol, (2) essentially saturated resorcinol polymer comprising resorcinol units connected in the resorcinol nucleus by alkylene bridges, (1) and (2) being the condensation product mixture of resorcinol and said polymer resulting from introducing olefinic unsaturated radical of 3–10 carbon atoms into the resorcinol nucleus within the range of about 0.1 to 0.6 mole of unsaturated radical per mole of resorcinol charged, and (3) an aldehyde selected from the group consisting of saturated aliphatic aldehydes having straight or branched chains of one to six carbon atoms, paraformaldehyde and paraldehyde, in an amount in a range of about 0.2 to about 0.7 mole per mole of resorcinol charged in making said mixture.

2. The solution of claim 1 wherein the unsaturated radical is derived from the group consisting of (1) halo-olefin, (2) dihalo-olefin, (3) acyclic or cyclic diolefin, and (4) olefinic alcohol or olefinic alcohol precursor.

3. The solution of claim 2 wherein the aldehyde is formaldehyde.

4. The solution of claim 3 wherein the unsaturated radical is allyl.

5. The solution of claim 3 wherein the unsaturated radical is derived from an unsaturate selected from the group consisting of 3-chloropropene, 1,4-dichloro-2-butene, 2,3-dichloropropene, 3,4-dichloro-1-butene, 5,7-dimethyl-1,6-octadiene, 1,3-pendatiene and 1,5-cyclooctadiene.

6. The solution of claim 5 wherein the polymer is a reaction product of resorcinol and 0.3 to 0.5 mole of 3-chloropropene per mole of resorcinol and the amount of formaldehyde is 0.3 to 0.5 mole per mole of resorcinol charged.

7. The solution of claim 3 wherein the unsaturated radical is derived from unsaturates selected from the group consisting of allyl alcohol, allyl acetate and allyl ether.

8. The solution of claim 7 wherein the polymer is the reaction product of resorcinol and 0.3 to 0.5 mole of allyl alcohol per mole of resorcinol and the amount of formaldehyde is 0.3 to 0.5 mole per mole of resorcinol charged.

9. A fluid alkaline adhesive composition comprising 80%–60% by weight water and 20%–40% by weight solids which solids comprise (a) 30%–75% by weight of solids of diene rubber latex, (b) 15%–45% by weight water soluble metal primer which is the condensation product of a phenol selected from the group consisting of monohydric phenol, dihydric phenol and alkylated mono- or di-hydric phenol having one or more methyl groups attached to the benzene ring and 0.9–1.8 mole per mole of phenol of an aldehyde selected from the group consisting of saturated aliphatic aldehydes having straight or branched chains of 1–6 carbon atoms, paraformaldehyde and paraldehyde and (c) 20%–60% by weight soluble conjoint condensate of (1) resorcinol, (2) essentially saturated resorcinol polymer comprising resorcinol units collected in the resorcinol nucleus by alkylene bridges, (1) and (2) being the condensation product mixture of resorcinol and said polymer resulting from introducing olefinic unsaturated radical of 3–10 carbon atoms into the resorcinol nucleus within the range of about 0.1 to 0.6 mole of unsaturated radical per mole of resorcinol charged, and (3) said aldehyde, in an amount in the range of about 0.2 to about 0.7 mole per mole of resorcinol charged in making said mixture.

10. Composition of claim 9 wherein the unsaturated radical is derived from the group consisting of (1) halo-olefin, (2) dihalo-olefin, (3) acyclic or cyclic diolefin and (4) olefinic alcohol or olefinic alcohol precursor.

11. Composition of claim 10 wherein the aldehyde is formaldehyde and the unsaturated radical is allyl.

12. Composition of claim 11 comprising 75%–65% by weight water and 25%–35% by weight solids which solids comprise 40%–60% by weight of solids of diene rubber latex and 30%–40% by weight conjoint condensate.

13. The method of making a composition at least 5% soluble in aqueous alkaline medium for bonding fiber to rubber which comprises preparing a condensation product mixture of (1) resorcinol and (2) essentially saturated resorcinol polymer by introducing under acidic conditions olefinic unsaturated radical of 3–10 carbon atoms into the resorcinol nucleus within the range of about 0.1 to 0.6 mole of unsaturated radical per mole of resorcinol charged; and reacting said mixture with (3) an aldehyde selected from the group consisting of saturated aliphatic aldehydes having straight or branched chains of 1–6 carbon atoms, paraformaldehyde and paraldehyde, in an amount in the range of about 0.2 to about 0.7 mole of aldehyde per mole of resorcinol charged in making said mixture.

14. The method of claim 13 wherein the unsaturated radical is derived from an unsaturate selected from the group consisting of (1) halo-olefin, (2) dihalo-olefin, (3) acyclic or cyclic diolefin and (4) olefinic alcohol or olefinic alcohol precursor.

15. The method of claim 14 wherein the aldehyde is formaldehyde.

16. The method of claim 15 wherein the unsaturated radical is allyl.

17. The method of claim 16 wherein the unsaturated radical is derived from an unsaturate selected from the group consisting of 3-chloropropene, 1,4-dichloro-2-butene, 2,3-dichloropropene, 3,4-dichloro-1-butene, 5,7-dimethyl-1,6-octadiene, 1,3-pentadiene and 1,5-cyclooctadiene.

18. The method of claim 17 wherein the unsaturated radical is derived from 3-chloropropene in the ratio of 0.3 to 0.5 mole per mole of resorcinol and the amount of formaldehyde is between 0.3 to 0.5 mole per mole of resorcinol charged.

19. The method of claim 15 wherein the unsaturated radical is derived from an unsaturate selected from the group consisting of allyl alcohol, allyl acetate and allyl ether.

20. The method of claim 19 wherein the unsaturated radical is derived from allyl alcohol in the ratio of 0.3 to 0.5 mole per mole of resorcinol and the amount of formaldehyde is between 0.3 to 0.5 mole per mole of resorcinol charged.

21. An aqueous alkaline solution of at least 5% solids of adhesive or adhesive adjuvant for bonding fiber to rubber comprising the conjoint condensate of (1) resorcinol (2) essentially saturated resorcinol polymer said polymer being characterized by resorcinol units separated by 2 to 8 alkylene carbon atoms in the chain between the aromatic nuclei having a number average molecular weight of 450–750 and a weight average molecular weight of 500–1200; and (3) an aldehyde selected from the group consisting of saturated aliphatic aldehydes having straight or branched chains of one to six carbon atoms, paraformaldehyde and paraldehyde, said condensate having a number average molecular weight of 700–1800 and a weight average molecular weight of 900–10,000.

22. The solution of claim 21 wherein the aldehyde is formaldehyde.

23. The solution of claim 22 wherein the alkylene bridge is 1-methyl-1,2-dimethylene.

24. A conjoint condensate of (1) resorcinol, (2) essentially saturated resorcinol polymer comprising resorcinol units connected in the resorcinol nucleus by alkylene bridges, (1) and (2) being the condensation product mixture of resorcinol and said polymer resulting from introducing olefinic unsaturated radical of 3–10 carbon atoms into the resorcinol nucleus within the range of about 0.1 to 0.6 mole of unsaturated radical per mole of resorcinol charged, and (3) an aldehyde selected from the group consisting of saturated aliphatic aldehydes having straight or branched chains of one to six carbon atoms, paraformaldehyde and paraldehyde, in an amount in a range of about 0.2 to about 0.7 mole per mole of resorcinol charged in making said mixture, said condensate being at least 5% soluble in aqueous alkaline medium.

25. The condensate of claim 24 in solid form wherein the unsaturated radical is derived from the group consisting of (1) halo-olefin, (2) dihalo-olefin, (3) acyclic or cyclic diolefin, and (4) olefinic alcohol or olefinic alcohol precursor.

26. The condensate of claim 25 wherein the aldehyde is formaldehyde.

27. The condensate of claim 26 wherein the unsaturated radical is allyl.

28. The condensate of claim 26 wherein the unsaturated radical is derived from an unsaturate selected from the group consisting of 3-chloropropene, 1,4-dichloro-2-butene, 2,3-dichloropropene, 3,4-dichloro-1-butene, 5,7-dimethyl-1,6-octadiene, 1,3-pentadiene and 1,5-cyclooctadiene.

29. The condensate of claim 28 wherein the polymer is a reaction product of resorcinol and 0.3 to 0.5 mole of 3-chloropropene per mole of resorcinol and the amount of formaldehyde is 0.3 to 0.5 mole per mole of resorcinol charged.

30. The condensate of claim 26 wherein the unsaturated radical is derived from an unsaturate selected from the group consisting of allyl alcohol, allyl acetate and allyl ether.

31. The condensate of claim 30 wherein the polymer is the reaction product of resorcinol and 0.3 to 0.5 mole of allyl alcohol per mole of resorcinol and the amount of formaldehyde is 0.3 to 0.5 mole per mole of resorcinol charged.

References Cited

UNITED STATES PATENTS

| | | | |
|---|---|---|---|
| 2,397,627 | 4/1946 | Smith | |
| 3,437,610 | 4/1969 | Moult | 260—29.3 |
| 3,194,294 | 7/1965 | Van Gils | 260—29.3 |
| 3,549,576 | 12/1970 | Anderson et al. | 260—29.3 |
| 3,637,430 | 1/1972 | Dahms et al. | 260—29.3 |

LORENZO B. HAYES, Primary Examiner

U.S. Cl. X.R.

117—126 GB, 128.4; 156—335; 260—54, 845